United States Patent
Lin et al.

(10) Patent No.: US 9,302,592 B2
(45) Date of Patent: Apr. 5, 2016

(54) ELECTRIC VEHICLE BATTERY EXCHANGING SYSTEM FOR REUSE APPLICATIONS

(71) Applicant: Go-Tech Energy Co., Ltd., New Taipei (TW)

(72) Inventors: Hung-Lan Lin, New Taipei (TW); Li-Zen Lai, Taipei (TW)

(73) Assignee: Go-Tech Energy Co. Ltd., New Taipei (TW)

( * ) Notice: Subject to any disclaimer, the term of this patent is extended or adjusted under 35 U.S.C. 154(b) by 156 days.

(21) Appl. No.: 14/308,222

(22) Filed: Jun. 18, 2014

(65) Prior Publication Data

US 2015/0367743 A1    Dec. 24, 2015

(51) Int. Cl.
| | |
|---|---|
| *H02J 7/00* | (2006.01) |
| *B60L 1/00* | (2006.01) |
| *B60L 3/00* | (2006.01) |
| *H02G 3/00* | (2006.01) |
| *B61K 1/00* | (2006.01) |
| *B60K 1/00* | (2006.01) |
| *B60L 11/18* | (2006.01) |

(52) U.S. Cl.
CPC ......... *B60L 11/1822* (2013.01); *B60L 11/1824* (2013.01); *B60L 11/1857* (2013.01); *B60L 11/1861* (2013.01); *B60L 11/1864* (2013.01); *B60L 11/1879* (2013.01); *B60K 1/00* (2013.01); *B60L 1/00* (2013.01); *B60L 3/00* (2013.01); *B61K 1/00* (2013.01); *H02G 3/00* (2013.01); *H02J 7/00* (2013.01)

(58) Field of Classification Search
CPC .... H02J 7/00; B60L 11/1822; B60L 11/1824; B60L 11/1857; B60L 11/1861; B60L 11/1864; B60L 11/1879; B60L 1/00; B60L 3/00; H02G 3/00; B61K 1/00; B60K 1/00
USPC ................. 320/109, 112; 307/10.1; 104/34
See application file for complete search history.

(56) References Cited

U.S. PATENT DOCUMENTS

| | | | |
|---|---|---|---|
| 6,177,879 B1 * | 1/2001 | Kokubu | B60L 11/1801 340/432 |
| 6,639,585 B1 * | 10/2003 | Nagai | G06F 3/046 345/173 |
| 7,059,338 B1 * | 6/2006 | Kincaid | F16K 31/046 137/14 |
| 2010/0010698 A1 * | 1/2010 | Iwashita | B60L 3/12 701/22 |
| 2012/0078444 A1 * | 3/2012 | Mase | G06F 21/88 701/2 |
| 2013/0217332 A1 * | 8/2013 | Altman | H04H 60/90 455/41.2 |
| 2014/0300200 A1 * | 10/2014 | Ito | H02J 17/00 307/104 |
| 2014/0330453 A1 * | 11/2014 | Nakagawa | B60H 1/00428 701/2 |

* cited by examiner

*Primary Examiner* — Phallaka Kik
(74) *Attorney, Agent, or Firm* — Che-Yang Chen; Law Office of Michael Chen

(57) ABSTRACT

An electrical battery exchanging system for reuse application is disclosed. The system includes: a number of rechargeable battery packs, a battery condition detecting module, a user ID checking module, a power source, a charging controlling module. Since the system can monitor conditions of rechargeable battery cells of the rechargeable battery packs and uses user ID for operating control purpose, it has benefits of conveniently exchanging low-power battery with fully charged one, easily sorting out end-of-life batteries and getting them for recycle or reuse, simply charging service fee and stably operating under a business model.

14 Claims, 6 Drawing Sheets

ELECTRIC VEHICLE BATTERY EXCHANGING SYSTEM FOR REUSE APPLICATIONS

FIELD OF THE INVENTION

The present invention relates to an exchanging system for rechargeable battery packs. More particularly, the present invention relates to an electric vehicle battery exchanging system for rechargeable battery packs used in electric vehicles. With the system, a low-powered rechargeable battery pack can be exchanged with a full charged one; end-of-life rechargeable battery packs can be picked up to treat for recycle purpose.

BACKGROUND OF THE INVENTION

Rechargeable battery packs are widely used in many fields. For electric vehicles, a blooming industry, rechargeable battery packs play a very important role to provide power to move them. A very commonly seen business model for electric vehicles is to sell the electric vehicles along with rechargeable battery packs. Drivers can charge the batteries by themselves at home. Or like gas station, many charging stations are built over a city for electric vehicles to get charged. It is convenient for the drivers to use their free time to charge their vehicles. For example, an electric vehicle can be charged after it is parked and the driver goes to work. Before the driver gets off work, the electric vehicle finishes charging and can take the driver home. Also, electric vehicles produce no greenhouse effect gases. Electric vehicles with such business model are welcome in many countries.

However, there is still a problem which troubles owners of the electric vehicles. Since the rechargeable battery packs are fixed on the electric vehicle or not easily taken out of the electric vehicle for inspection or exchanging, when the rechargeable battery packs are getting losing power capacity, people think they are ill or even broken. The whole electric vehicle is abandoned with the rechargeable battery packs inside. It impacts environment because the rechargeable battery packs are mostly made of lithium battery cells. If the rechargeable battery packs can not be properly recycled, the earth could be contaminated by the discarded vehicles.

A solution is provided by Guimarin, et al. and disclosed in U.S. Pat. No. 5,612,606. It points out an integrated electric vehicle service station system for managing the exchange of heavy and bulky battery assemblies in electric vehicles. The battery exchange system includes a battery platform, a vehicle platform support structure, and a mechanized vehicle service station facility. The battery platform is of a simple modular shape that may be used with the large variety of sizes and shapes of electric vehicles that may be expected in the future. The service station facility includes two general service substations: an exchange substation where the spent battery platform is removed from the vehicles and replaced with a fully charged platform, and a staging substation where the battery platforms are stored, re-charged, serviced, and staged for insertion into a waiting vehicle at the exchange substation. The exchange substation is such that the exchange of a battery platform for an electric vehicle positioned at the exchange substation is able to proceed automatically and rapidly with a minimum of operator assistance so as to minimize the inconvenience to the vehicle driver.

'606 had novel concept and design around 20 years ago. First, it uses modulized battery platform to get replaced for many kinds of electric vehicles having such battery platform for power. Vehicle problems can be separated into two categories, of mechanism or of battery. It helps recycle used battery platform and maintain the rest parts of the electric vehicle. Second, Battery platforms can be charged in other place in non-rush hours. Third, with the help of automatically operated exchange substation, exchange time of battery platform can be saved. As long as there are fully charged battery platform, any electric vehicle can get fast battery platform exchanged without waiting.

However, other problems come after. An obvious one is that vehicle drivers will not know how much electric power is charged in the battery platform because battery platforms will age but just different in the extent. Another one is that it is hard to calculate a fair fee for the transaction. People can not judge the service they brought upon the appearance of the battery platform.

In order to solve the problems mentioned above, R.O.C. Application No. 201044289 discloses an electric vehicle battery charging and exchanging method. For a more detailed explanation, please refer to FIG. 1. The invention provides configuration system which includes batteries 1, 1A and 1B (Battery 1B is a spare battery in a battery exchange station 4). The batteries all include a radio frequency identification chip 11 and a memory 12. The battery 1A is installed in a vehicle 2 for use until it is getting low. Then, the user of the vehicle 2 can exchange the battery 1A with the battery 1 in the battery exchange station 4 for battery exchange. Via the radio frequency identification chip 11 and the memory 12, battery status information can be available for judging and calculating the price difference between the two batteries 1A and 1, from which the user pays corresponding fee to the battery exchange station 4.

This invention provides a system that any owner of the electric vehicles can be benefited from. The batteries can be exchanged easily and fairly charged for the service. However, people still wonder, under such system, how the operator of the battery differentiates end-of-life batteries from good batteries. It causes other issues.

Hence, a way for settling below issues are urgently desired:
1. conveniently exchanging low-power battery with fully charged one;
2. easily sorting out end-of-life batteries and getting them recycled or reuse;
3. simply charging service fee;
4. preferably monitoring condition of batteries; and
5. stably operating under a business model.

SUMMARY OF THE INVENTION

This paragraph extracts and compiles some features of the present invention; other features will be disclosed in the follow-up paragraphs. It is intended to cover various modifications and similar arrangements included within the spirit and scope of the appended claims.

In accordance with an aspect of the present invention, an electric vehicle battery exchanging system for reuse applications includes: a plurality of rechargeable battery packs, each including: a plurality of rechargeable battery cells linked in series or parallel connection; and a battery cell detecting unit, electrically linked to each rechargeable battery cells, for detecting battery conditions of each rechargeable battery cell and transmitting the battery conditions externally; a battery condition detecting module, for receiving the battery conditions transmitted from the battery cell detecting unit and sending out a judged command for each rechargeable battery pack based on the battery condition from each rechargeable battery pack to determine if the rechargeable battery pack is allowed to be charged; a user ID checking module, for communicating with a user ID device which contains a user ID, checking if the user ID is registered in the user ID checking module under a commercial condition, and sending out a confirmed information when the user ID is registered in the user ID checking module under the commercial condition; a power source, linked to an external power grid, for providing the reduced voltage power; a charging controlling module, electrically linked to the rechargeable battery packs, the battery condition detecting module, the user ID checking module and the power source, for charging the rechargeable battery pack determined by the judged command, processing charging until a predetermined battery status is fulfilled and recording amount of power charged; and a battery managing module, electrically linked to the user ID checking module and the charging controlling module, for allowing one rechargeable battery pack to be released for use if the predetermined battery status is met and the confirmed information is received or temporarily stored if the predetermined battery status is met but the confirmed information is not received.

Preferably, the battery condition includes terms of output voltage, state of health (SOH), state of charge (SOC), output current, charging cycle and lifetime.

Preferably, each of the terms has a threshold, and the judged command is not sent to allow the rechargeable battery pack to be charged as long as any value of the terms doesn't meet the corresponding threshold.

Preferably, the battery condition detecting module is further for determining which rechargeable battery pack to be repaired for recycling rechargeable battery cells if the threshold of the battery condition of that rechargeable battery pack is not met.

Preferably, the user ID checking module further includes a wireless communicating unit for communicating with the user ID device.

Preferably, the wireless communicating unit is a near field communication (NFC) device, a Radio-Frequency Identification (RFID) reader, Wi-Fi wireless communicating device or Bluetooth device.

Preferably, the user ID device is a smart card, mobile phone or a key chain which contains a wireless communicating element for communicating with the user ID checking module and records the user ID.

Preferably, the wireless communicating element is a NFC device, a RFID tag, Wi-Fi wireless communicating device or Bluetooth device.

Preferably, the electric vehicle battery exchanging system further includes a remote server, wired or wireless connected with the battery condition detecting module, user ID checking module, charging controlling module, and battery managing module, for recording data of operations thereof, registering the user ID with data of an owner and alarming if the owner claimed the user ID device was lost while the user ID device is used for requesting battery exchange.

Preferably, the commercial condition is that at least one of the rechargeable battery packs is rented to, leased to, or sold to whom owns the user ID device from the electric vehicle battery exchanging system.

Preferably, the predetermined battery status is a percentage of power charged in the rechargeable battery pack.

Preferably, the charging controlling module further comprises a charging scheduling unit, for determining a schedule to charge each rechargeable battery pack.

Preferably, the rechargeable battery packs are used for electric vehicles with high power capacity.

Preferably, the power capacity of the rechargeable battery pack is at least 48V16Ah.

DETAILED DESCRIPTION OF THE PREFERRED EMBODIMENTS

The present invention will now be described more specifically with reference to the following embodiments.

First Embodiment

Figure 1:
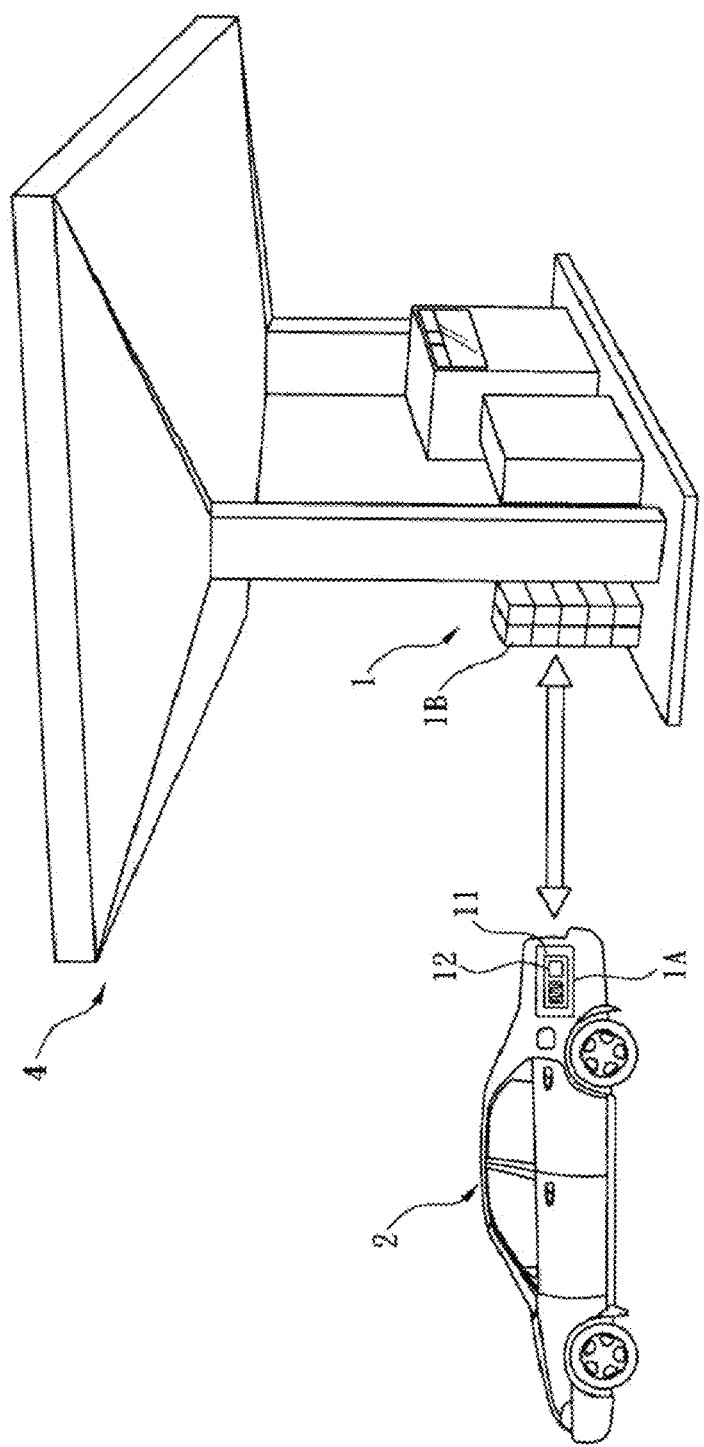
FIG. 1 shows a prior art of an electric vehicle battery charging and exchanging method.
Figure 2:
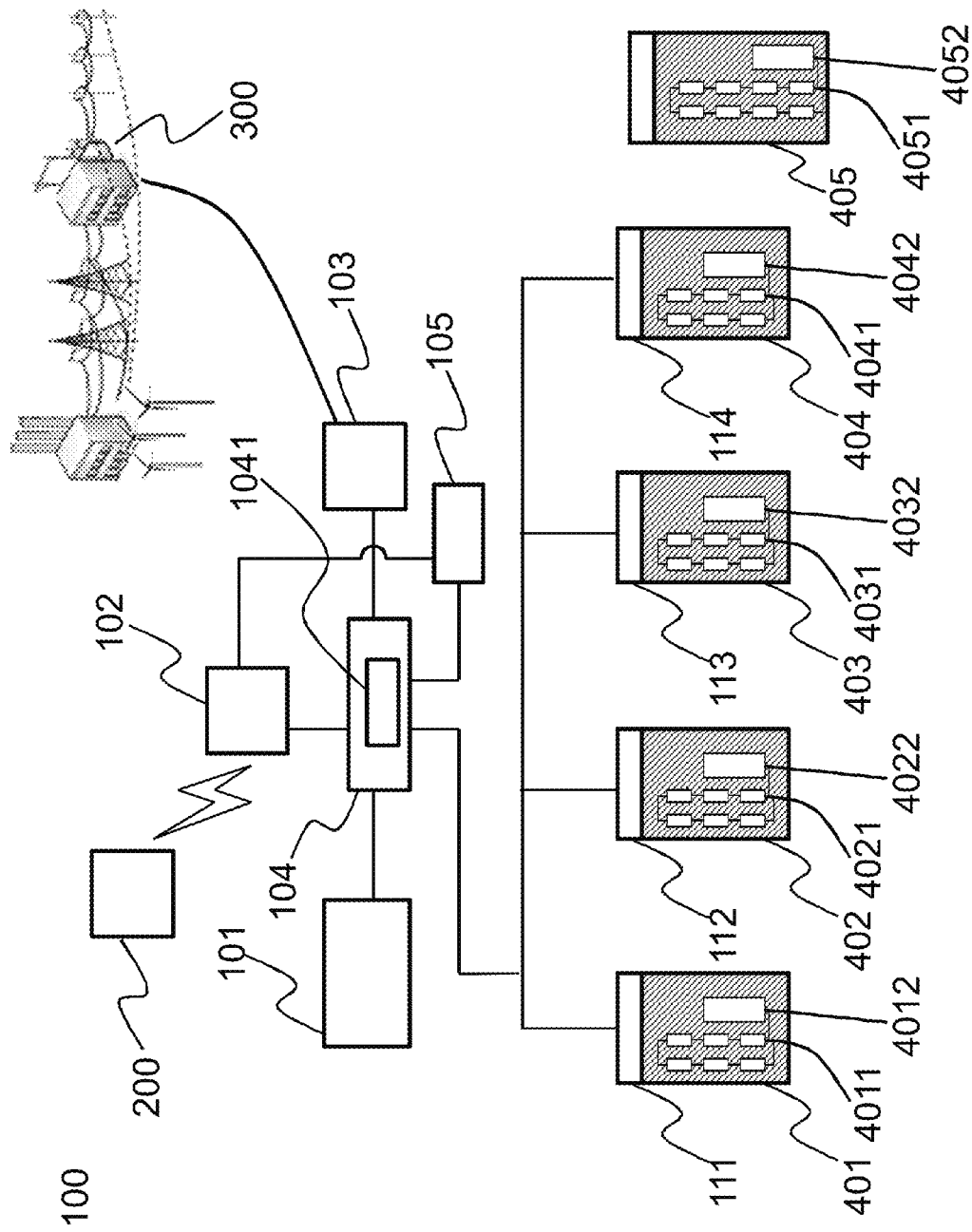
FIG. 2 illustrates a schematic diagram of a first embodiment of the present invention.
Figure 3:
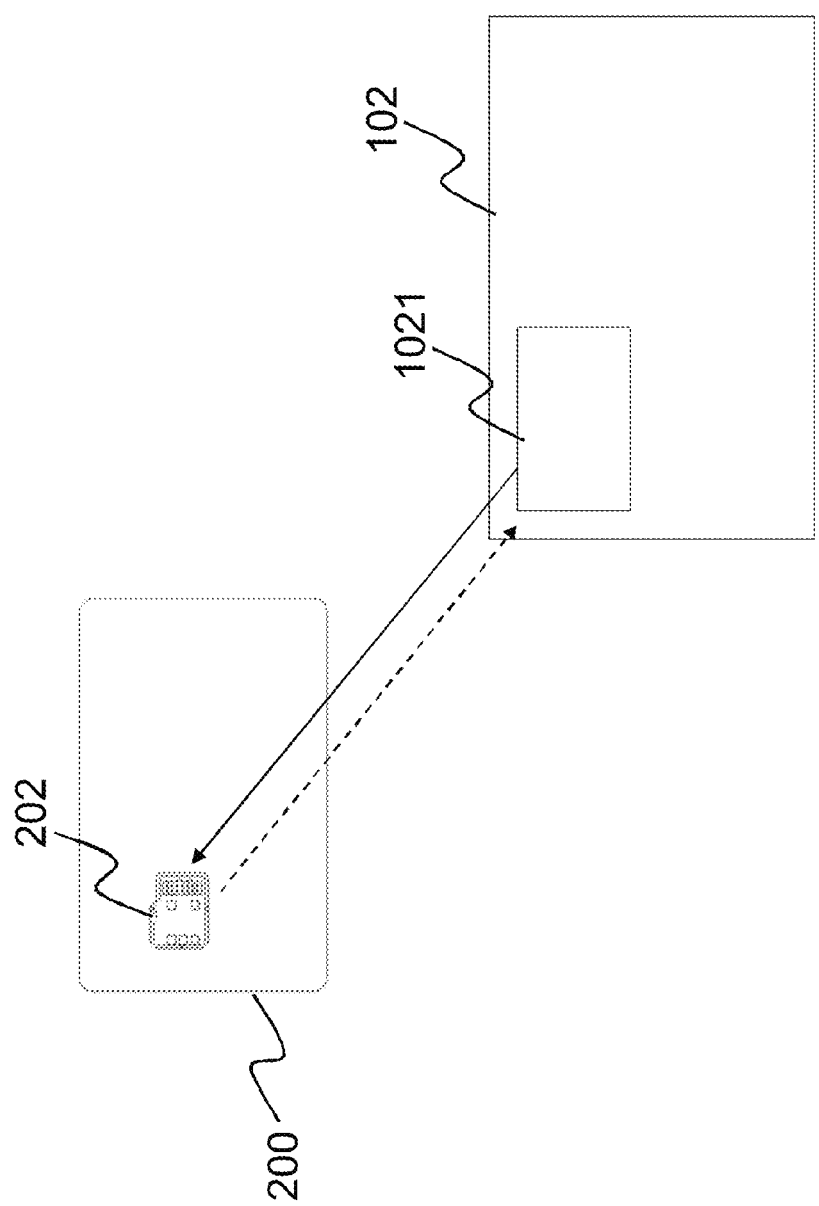
FIG. 3 illustrates a detailed description of a user ID checking module and a user ID device in the first embodiment.
Figure 4:
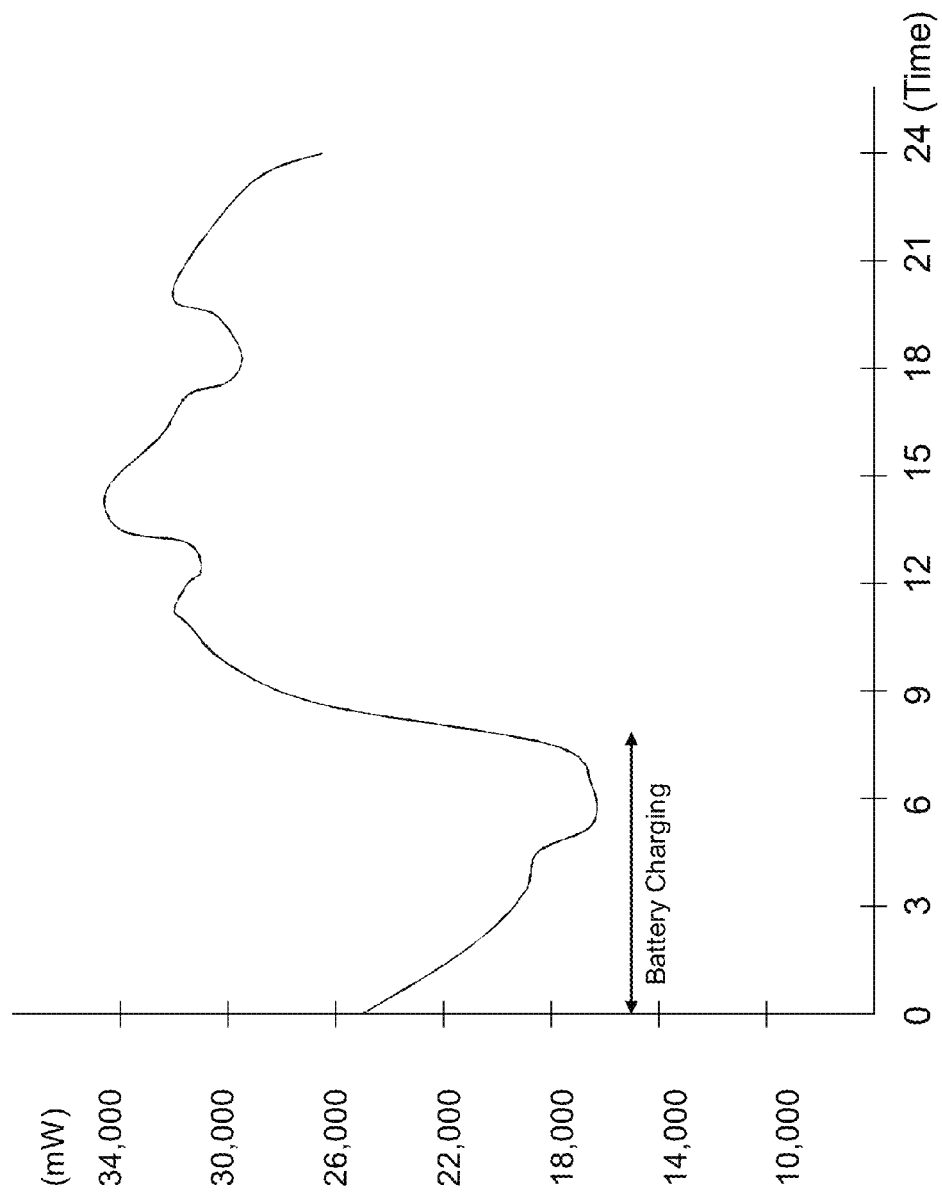
FIG. 4 shows a typical power load curve.

Please refer to FIG. 2 to FIG. 4. FIG. 2 illustrates a schematic diagram of a first embodiment of the present invention. FIG. 3 illustrates a detailed description of a user ID checking module and a user ID device in the first embodiment. FIG. 4 shows a typical power load curve.

An electric vehicle battery exchanging system 100 for reuse applications is described in FIG. 2. The electric vehicle battery exchanging system 100 has rechargeable battery packs 401, 402, 403, 404 and 405, a battery condition detecting module 101, a user ID checking module 102, a power source 103, a charging controlling module 104, and a battery managing module 105.

In this embodiment, the rechargeable battery packs 401, 402, 403, 404 and 405 are all in the same spec, 48V16Ah. For illustration purpose, the rechargeable battery packs 401 and 402 are fully charged while the rechargeable battery packs 403 and 404 are under charging from the electric vehicle battery exchanging system 100. Rechargeable battery pack 405 is in low power situation and needed to be charged by the electric vehicle battery exchanging system 100. Each of the rechargeable battery packs 401, 402, 403, 404 and 405 has a number of rechargeable battery cells linked in series or parallel connection. The rechargeable battery packs 401 have 6 rechargeable battery cells 4011. 3 rechargeable battery cells are linked in series connection as a battery string. 2 battery strings are linked in parallel connection. Similarly, the rechargeable battery packs 402, 403 and 404 have 6 rechargeable battery cells 4021, 4031 and 4041, respectively. Arrangement of the rechargeable battery cells 4021, 4031 and 4041 is the same as that of rechargeable battery cells 4011. The rechargeable battery packs 405 is not the same spec as other rechargeable battery packs 401, 402, 403 and 404 and have 8 rechargeable battery cells 4051. 4 rechargeable battery cells are linked in series connection as a battery string. 2 battery strings are linked in parallel connection.

Each of the rechargeable battery packs 401, 402, 403, 404 and 405, respectively, has a battery cell detecting unit 4012, 4022, 4032, 4042 and 4052 which is electrically linked to each of the rechargeable battery cells in corresponding rechargeable battery packs. The battery cell detecting units 4012, 4022, 4032, 4042 and 4052 are arranged in the rechargeable battery packs 401, 402, 403, 404 and 405, respectively. Functions of the battery cell detecting units 4012, 4022, 4032, 4042 and 4052 are to detect battery conditions of each rechargeable battery cell linked and transmitting the battery conditions externally.

The battery condition detecting module 101 can receive the battery conditions transmitted from the battery cell detecting units 4012, 4022, 4032 and 4042. According to the present invention, the method of battery conditions transmitting is not limited. It can be wired or wireless. In this embodiment, it is wireless and the signals go through Wi-Fi bandwidth.

The battery condition mentioned above refers to a physical condition of the rechargeable battery cells 4011, 4021, 4031 and 4041. It can be output voltage of each rechargeable battery cell. It can also be an output current in each rechargeable battery cell. Preferably, below terms are considered as the battery condition: state of health (SOH), state of charge (SOC), charging cycle and lifetime. With the battery condition available, it is possible to know current status of a rechargeable battery cell. It can also determine if one rechargeable battery cell is too aged to be replaced with a workable one and abandoned for recycling useful materials. It can prevent the rechargeable battery packs 401, 402, 403, 404 and 405 from battery unbalance.

The battery condition detecting module 101 will send out a judged command for each rechargeable battery pack 401, 402, 403 or 404 based on the battery condition of each rechargeable battery pack 401, 402, 403 or 404. The judged command is used to determine if the rechargeable battery pack 401, 402, 403 or 404 is allowed to be charged. As above-mentioned, if one rechargeable battery cell in a recharge battery pack is too aged or one rechargeable battery pack has a potential to expose due to badly use, the judged command will not be sent to allow the recharge battery pack to be charged. Each of the terms of the battery condition has a threshold. The judged command will not be sent to allow the rechargeable battery packs to be charged as long as any value of the terms doesn't meet the corresponding threshold. For example, if a threshold of charging cycle of a rechargeable battery cell is set as 2000 times, any rechargeable battery pack having rechargeable battery cell with charging cycle over 2000 times, for instance the 2001 times to be charged, will not be allowed to be charged.

The user ID checking module 102 can communicate with a user ID device 200 via a wireless communicating unit 1021. The wireless communicating unit 1021 used in the present invention is a radio-frequency identification (RFID) reader. The user ID device 200 can communicate with the user ID checking module 102 and record the user ID. The ID device 200 has the user ID stored in any form of data and in any kind of storage. Here, the ID device 200 is a smart card. It has a wireless communicating element 202 which stores the user ID and is in charge of communication with the wireless communicating unit 1021. Corresponding to the RFID reader, the wireless communicating element 202 is a RFID tag. The user ID checking module 102 also checks if the user ID is registered in the user ID checking module 102 under a commercial condition. The commercial condition is that at least one of the rechargeable battery packs 401, 402, 403 and 404 is rented to whom owns the user ID device 200 from The electric vehicle battery exchanging system 100. It is not specified which one of the rechargeable battery pack is rented to the owner of the ID device 200. If the owner rents one rechargeable battery pack from The electric vehicle battery exchanging system 100, he can pick up the rechargeable battery pack 401 or 402 for use and returned the one (not shown) he had used for exchange. The user ID checking module 102 can send out confirmed information when the user ID is registered in the user ID checking module 102 under the commercial condition. Function of the confirmed information will be described later.

The power source 103 is linked to an external power grid 300. The power grid 300 provides high voltage electrical power which is not suitable for power charging. Therefore, the power source 103 can reduce voltage of the power from the power grid 300 and then provide the reduced voltage electric power to where it is needed.

The charging controlling module 104 is electrically linked to the rechargeable battery packs 401, 402, 403 and 404, as well as the battery condition detecting module 101, the user ID checking module 102 and the power source 103. It is used to charge the rechargeable battery pack determined by the judged command. In this embodiment, all judge commands for the rechargeable battery packs 401, 402 and 404 indicate the rechargeable battery packs 401, 402 and 404 are fine to be charged but the rechargeable battery pack 403 has two rechargeable battery cells 4031 which are too aged to be used. The charging controlling module 104 will charge the rechargeable battery packs 401, 402, and 404 via the power connectors 111, 112, and 114, respectively. Further, the charging controlling module 104 processes charging until a predetermined battery status is fulfilled and record amount of power charged. The predetermined battery status is set to be fully charged. It can be a percentage of power charged in the rechargeable battery pack, for example, 90% of full charge, depending on customer's request or battery condition.

The battery managing module 105 is electrically linked to the user ID checking module 102 and the charging controlling module 104. It can allow one rechargeable battery pack to be released for use if the predetermined battery status is met and the confirmed information is received. Here, we still use full charge as the predetermined battery status for all rechargeable battery packs 101, 102, 103 and 104. Since the rechargeable battery packs 101 and 102 are full charged, it should be released from the electric vehicle battery exchanging system 100 to use with the confirmed information. If an owner carries a user ID device but a user ID inside isn't under the rental condition mentioned above (It might be that the owner has just registered the user ID but didn't rent the rechargeable battery packs, or rental deadline is expired), the user ID checking module 102 won't send the confirmed information to the battery managing module 105. The battery managing module 105 will not allow any of the rechargeable battery packs 401 and 402 to be released to use unless the owner pays money to rent rechargeable battery packs again. The battery managing module 105 allows the rechargeable battery packs 101 and 102 to be temporarily stored if the predetermined battery status is met but the confirmed information is not received. The mechanism can ensure a business model based on rental relationship. For convenience, one rechargeable battery pack can be released by the operator of the electric vehicle battery exchanging system 100 if necessary, for instance, the owner has already paid money to rent a rechargeable battery pack but the user ID checking module 102 can not update immediately.

In addition, the charging controlling module 104 further includes a charging scheduling unit 1041. It is used to determine a schedule to charge the rechargeable battery packs 101, 102, 103 and 104. In order to have a better understanding of functions of the charging scheduling unit 1041, please refer to FIG. 4. FIG. 4 is a typical power load curve. The x-axis is time of a day (hour). The y-axis is power load (mW). From the curve, there are some important points. First, power load varies from time to time. Simply classified, from 0:00 AM to 8:00 AM, power load drops to a lowest amount. This is off-peak time and the power demand is off-peak electricity consumption. It is reasonable that the most people sleep or take a rest within the time frame. From 8:00 AM to the 12:00 PM (peak time), power load raises up to a peak value and then gradually drops after 8:00 PM. Since people still work or move around after 8:00 PM, power demand is still high and 8:00 PM to 12:00 PM is still be classified as peak time. Hence, the charging scheduling unit 1041 can set 0:00 AM to 8:00 AM to charge rechargeable battery packs. Usually, power cost in off-peak time is cheaper than that in peak time. With the charging scheduling unit 1041, operation cost of the electric vehicle battery exchanging system 100 can be saved. Power plant can also reduce loading in rush hours, further prevent power generators from tripping.

Of cause, the charging scheduling unit 1041 can determine a charging schedule during the peak time if there are too many rechargeable battery packs asking for charging or local power policy has special request (rolling blackouts).

In addition to the description of the present invention mentioned above. There are some features of the electric vehicle battery exchanging system 100. First, the battery condition detecting module 101 can further determine which rechargeable battery pack to be repaired for recycling rechargeable battery cells if the threshold of the battery condition of that rechargeable battery pack is not met. It is to say that the electric vehicle battery exchanging system 100 is able to pick up the rechargeable battery packs which are not suitable for current job. By recycling those unsuitable rechargeable battery cells, new and higher efficient rechargeable battery packs can be created and the recycled materials can be used in other field. Second, although the system is for electric vehicles mainly, under control of ID and rechargeable battery pack condition, the rechargeable battery pack can be taken for further reuse applications as long as the commercial condition is fulfilled. For example, a set of full charged rechargeable battery packs can be used for power of an electric boat.

Since the rechargeable battery packs used in the present embodiment are mainly for electric vehicles, they have high power capacity. For example, the power capacity of the rechargeable battery pack is at least 48V16 Ah. According to the design and requirement of the electric vehicles using the services of the electric vehicle battery exchanging system 100, battery capacity can be 48V80 Ah or higher. The present invention doesn't limit to apply one spec of rechargeable battery pack. Rechargeable battery packs of two or more power capacities can be serviced in one electric vehicle battery exchanging system 100. For example, the rechargeable battery pack 405 waiting for charge has higher power capacity, 48V80 Ah.

It should be emphasized that, according to the present invention, number of the rechargeable battery pack is not limited to 5. Number of power connectors can be more than 4. It depends on requirement of an electric vehicle battery exchanging system. The commercial condition is not limited to rental business model. Rechargeable battery packs can be leased to or sold to whom owns a user ID device with valid user ID. Or, some user IDs which are allowed to rent rechargeable battery packs while some are allowed to own rechargeable battery packs.

It is also obvious that the electric vehicle battery exchanging system 100 is illustrated as a standalone work station. Actually, according to the spirit of the present invention, a number of such systems linked together and controlled by a remote server can also be a diversification. It will be described in details in a second embodiment.

Second Embodiment

Figure 5:
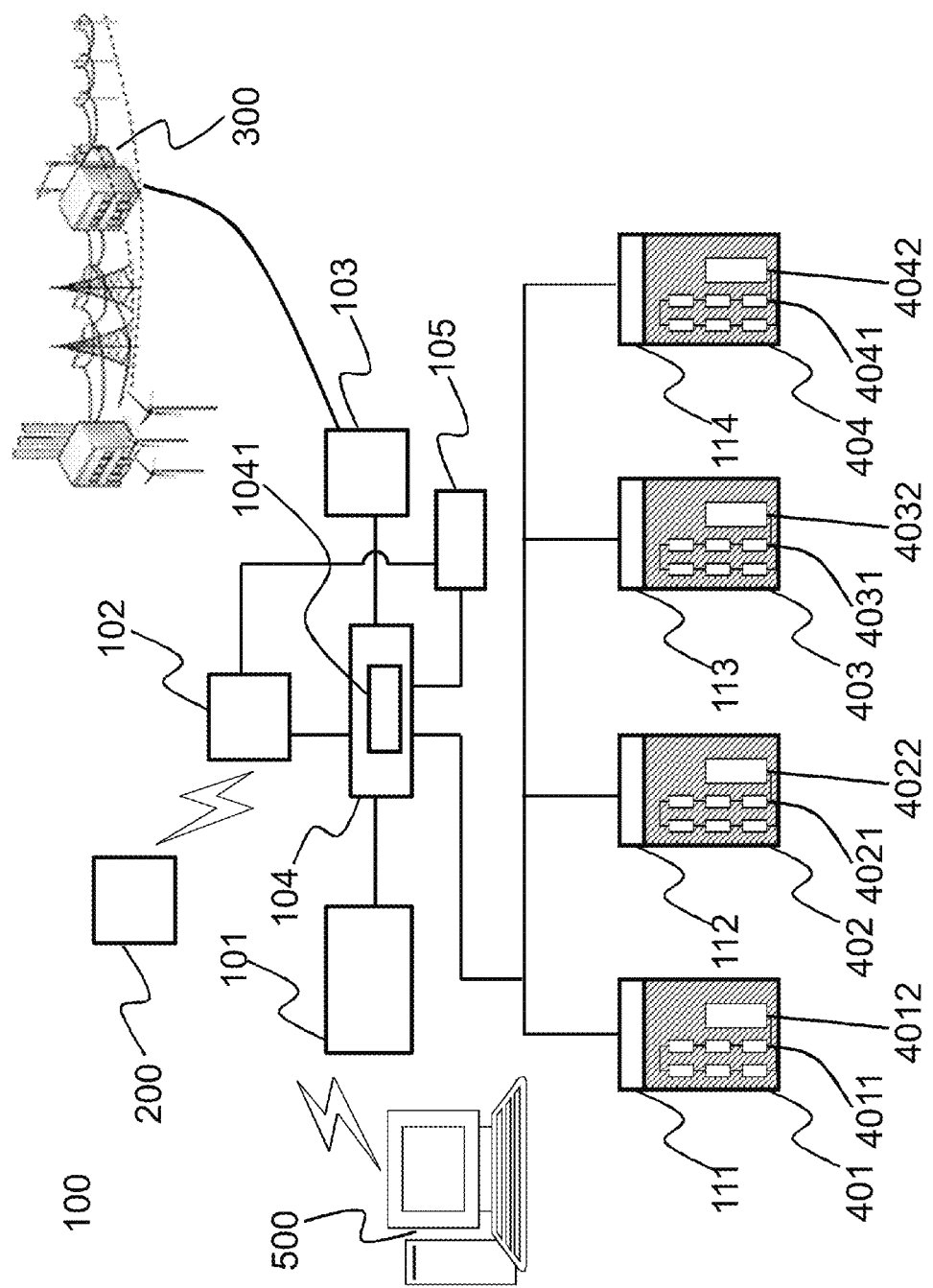
FIG. 5 illustrates a schematic diagram of a second embodiment of the present invention.
Figure 6:
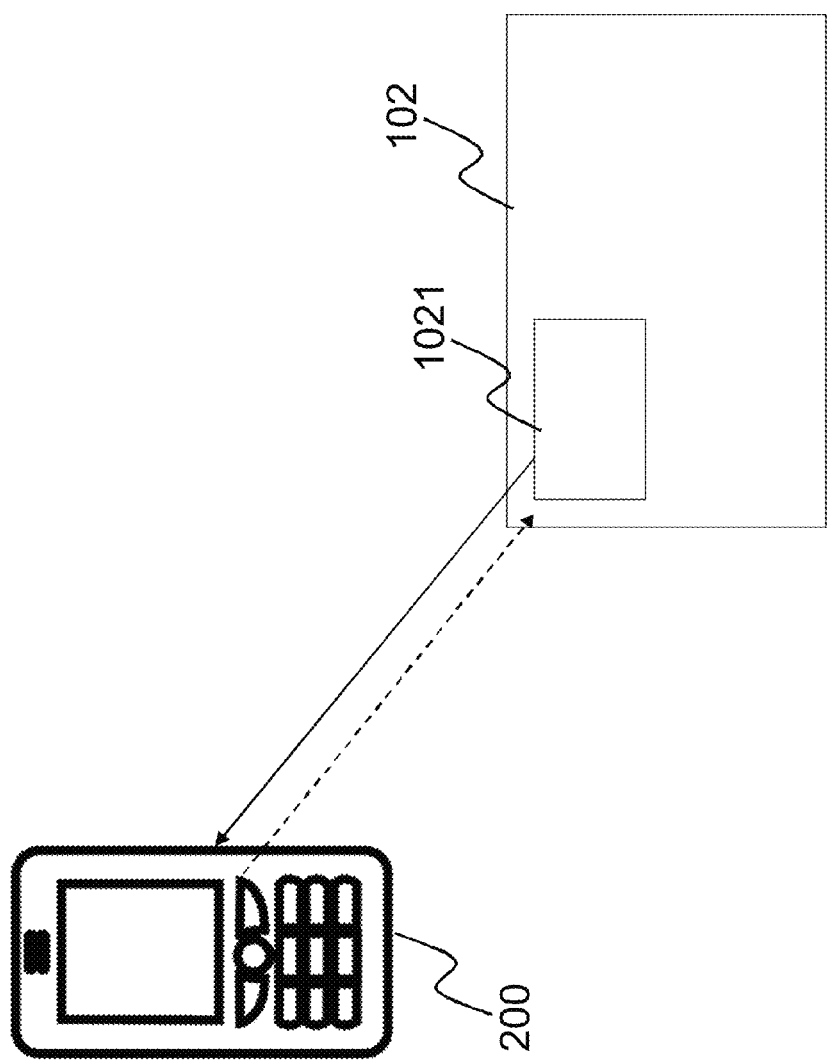
FIG. 6 illustrates a detailed description of a user ID checking module and a user ID device in the second embodiment.

Please refer to FIG. 5 and FIG. 6. The second embodiment is illustrated therein. In order not to waste time, all elements in the second embodiment are inherited from the first embodiment and have the same functions, except those having elements described below.

The first different element is wireless communicating unit 1021. Please refer to FIG. 6. It is a Wi-Fi wireless communicating device. It can communicate with the user ID device 200. Here, the user ID device 200 is a mobile phone. The mobile phone also has a Wi-Fi wireless communicating device (not shown). With an app software in the user ID device 200 (mobile phone), the user ID device 200 can communicate with the user ID checking module 102. After the user ID is identified, charging processes begin. According to the present invention, the wireless communicating unit 1021 can also be a near field communication (NFC) device or a Bluetooth device. Accordingly, another NFC device or Bluetooth device can be used as the wireless communicating element 202. Therefore, the user ID device 200 can be in a form of key chain or other potable electrical devices.

The electric vehicle battery exchanging system 100 also has a remote server 500. The remote server 500 is wireless connected with the battery condition detecting module 101, user ID checking module 102, charging controlling module 104, and battery managing module 105. The connection of the elements mentioned above can be wired, too. It can be partially wired or partially wireless. Construction cost and availability are the consideration. The remote server 500 records data of operations of the battery condition detecting module 101, user ID checking module 102, charging controlling module 104, and battery managing module 105. It can register the user ID with data of an owner. Furthermore, the remote server 500 can alarm if the owner claimed the user ID device was lost but the user ID device is still used for requesting battery exchange. For example, if the user ID device 200 is stolen but someone used it to charge battery (exchange low-powered rechargeable battery pack with a fully charged one), the remote server 500 alarms and it helps the police to investigate the case. The remote server 500 of the present invention is not limited to be used for one electric vehicle battery exchanging system 100. Two or more electric vehicle battery exchanging systems can be linked to and controlled by one remote server. In this case, a number of electric vehicle battery exchanging systems and the remote server work as one network system. It is also within the spirit of the present invention.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims, which are to be accorded with the broadest interpretation so as to encompass all such modifications and similar structures.

What is claimed is:

1. An electric vehicle battery exchanging system for reuse application, comprising:
   a plurality of rechargeable battery packs, each comprising:
      a plurality of rechargeable battery cells linked in series or parallel connection; and
      a battery cell detecting unit, electrically linked to each rechargeable battery cells, for detecting battery conditions of each rechargeable battery cell and transmitting the battery conditions externally;
   a battery condition detecting module, for receiving the battery conditions transmitted from the battery cell detecting unit and sending out a judged command for each rechargeable battery pack based on the battery condition from each rechargeable battery pack to determine if the rechargeable battery pack is allowed to be charged;

a user ID checking module, for communicating with a user ID device which contains a user ID, checking if the user ID is registered in the user ID checking module under a commercial condition, and sending out a confirmed information when the user ID is registered in the user ID checking module under the commercial condition;

a power source, linked to an external power grid, for providing power;

a charging controlling module, electrically linked to the rechargeable battery packs, the battery condition detecting module, the user ID checking module and the power source, for charging the rechargeable battery pack determined by the judged command, processing charging until a predetermined battery status is fulfilled and recording amount of power charged; and a battery managing module, electrically linked to the user ID checking module and the charging controlling module, for allowing one rechargeable battery pack to be released for use if the predetermined battery status is met and the confirmed information is received or temporarily stored if the predetermined battery status is met but the confirmed information is not received.

2. The electric vehicle battery exchanging system according to claim 1, wherein the battery condition comprises terms of output voltage, state of health (SOH), state of charge (SOC), output current, charging cycle and lifetime.

3. The electric vehicle battery exchanging system according to claim 2, wherein each of the terms has a threshold, and the judged command is not sent to allow the rechargeable battery pack to be charged as long as any value of the terms doesn't meet the corresponding threshold.

4. The electric vehicle battery exchanging system according to claim 3, wherein the battery condition detecting module is further for determining which rechargeable battery pack to be repaired for recycling rechargeable battery cells if the threshold of the battery condition of that rechargeable battery pack is not met.

5. The electric vehicle battery exchanging system according to claim 1, wherein the user ID checking module further comprises a wireless communicating unit for communicating with the user ID device.

6. The electric vehicle battery exchanging system according to claim 5, wherein the wireless communicating unit is a near field communication (NFC) device, a Radio-Frequency Identification (RFID) reader, Wi-Fi wireless communicating device or Bluetooth device.

7. The electric vehicle battery exchanging system according to claim 1, wherein the user ID device is a smart card, mobile phone or a key chain which contains a wireless communicating element for communicating with the user ID checking module and records the user ID.

8. The electric vehicle battery exchanging system according to claim 7, wherein the wireless communicating element is a NFC device, a RFID tag, Wi-Fi wireless communicating device or Bluetooth device.

9. The electric vehicle battery exchanging system according to claim 1, further comprising a remote server, wired or wireless connected with the battery condition detecting module, user ID checking module, charging controlling module, and battery managing module, for recording data of operations thereof, registering the user ID with data of an owner and alarming if the owner claimed the user ID device was lost while the user ID device is used for requesting battery exchange.

10. The electric vehicle battery exchanging system according to claim 1, wherein the commercial condition is that at least one of the rechargeable battery packs is rented to, leased to, or sold to whom owns the user ID device from the electric vehicle battery exchanging system.

11. The electric vehicle battery exchanging system according to claim 1, wherein the predetermined battery status is a percentage of power charged in the rechargeable battery pack.

12. The electric vehicle battery exchanging system according to claim 1, wherein the charging controlling module further comprises a charging scheduling unit, for determining a schedule to charge each rechargeable battery pack.

13. The electric vehicle battery exchanging system according to claim 1, wherein the rechargeable battery packs are used for electric vehicles with high power capacity.

14. The electric vehicle battery exchanging system according to claim 1, wherein power capacity of the rechargeable battery pack is at least 48V16 Ah.

\* \* \* \* \*